United States Patent [19]

Citron

[11] Patent Number: 4,926,010
[45] Date of Patent: May 15, 1990

[54] COMPACT KEYBOARD WITH ENTRY OF KEYED AND GRAPHIC INFORMATION

[75] Inventor: Howard M. Citron, Katonah, N.Y.

[73] Assignee: Nynex Corporation, New York, N.Y.

[21] Appl. No.: 374,255

[22] Filed: Jun. 30, 1989

[51] Int. Cl.[5] .............................................. G08C 21/00
[52] U.S. Cl. .......................................... 178/18; 178/19;
340/709; 340/711; 364/189; 364/190
[58] Field of Search ............................ 178/18, 19, 20;
340/706, 709, 711, 716; 364/189, 190

[56] References Cited

U.S. PATENT DOCUMENTS 4,725,694 2/1988 Auer et al. ............................ 178/18

Primary Examiner—Stafford D. Schreyer
Attorney, Agent, or Firm—Douglas Kirk; John J. Torrente

[57] ABSTRACT

A keyboard is adapted for entry of graphical information into a computer by providing the keyboard with an extended, two dimensional member situated in overlapping relationship with at least one of the keys of the keyboard and which is adapted to generate for storage and display by the computer a signal designating a position on the member.

12 Claims, 2 Drawing Sheets

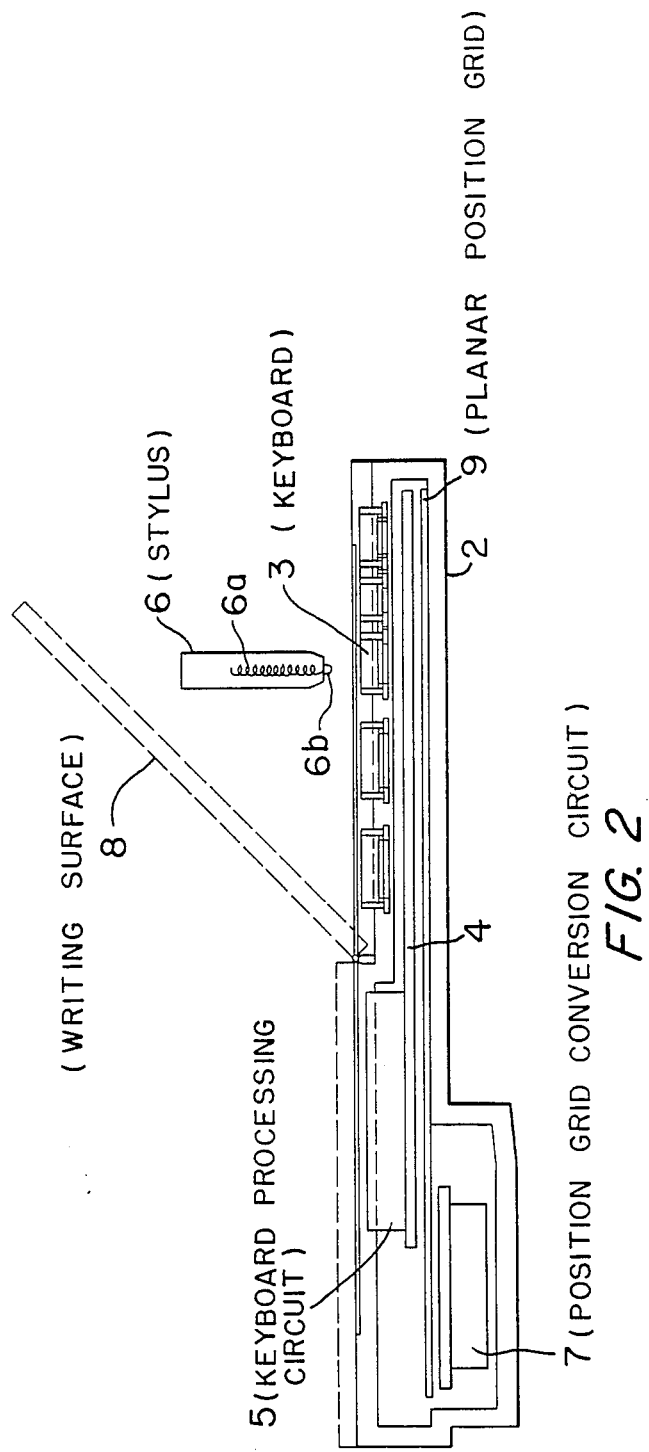

COMPACT KEYBOARD WITH ENTRY OF KEYED AND GRAPHIC INFORMATION

BACKGROUND OF THE INVENTION

This invention relates to data entry devices and, in particular, to data entry devices for entering keyed data and graphical information.

Keyboards which employ actuatable keys are well known devices for use in entering information into a variety of information systems. Thus, for example, in computer systems a keyboard whose keys correspond to alphanumeric characters is used for entry of data to the system. When a key of the keyboard is actuated, the integrated circuitry of the keyboard generates an information signal which is fed to the CPU of the computer system. The CPU recognizes this signal as the alphanumeric character associated with the key and the CPU then addresses a display, typically a cathode ray tube (CRT), instructing the display to depict the character so that the user can verify that the correct information has been entered.

In many computer systems, it has been found desirable to have the capability of also directly entering into the system handwritten and graphical information. This has been accomplished by providing, in addition to the keyboard, a separate input unit which is likewise connected to the computer. This unit includes an extended, two dimensional first member (sometimes referred to as a "tablet") and a second member (sometimes referred to as a "stylus" or "cursor") capable of designating a position on the first member. The nature of these members is such that when the second member is brought in proximity to a position to be designated on the first member, a signal or signals are developed which are indicative of the designated position. These signals are then detected and fed to the computer CPU which recognizes the signals as identifiying the designated position. The CPU then stores this information and also feeds it to the CRT display which depicts the position. By moving the second member, successive positions corresponding to a graphical representation can be designated, stored by the CPU and displayed by the CRT.

There are presently available numerous types of units employing first and second member combinations of this type, or their equivalents. One type of unit makes use of an electromagnetic coupling between a coil in the second member and a grid of planar wires situated in the first member. In this type of arrangement, the signals to and from the grid are fed through a conversion board or circuit which converts the signals to positional signals identifiable by the computer CPU. These types of arrangements are disclosed, for example in U.S. Pat. Nos. 4,570,033 and 4,552,991. Units of this type are also sold as so-called "digitizers" by Numonics Corp under Model No. 2210.

Another type of arrangement makes use of a first member comprised of a resistive layer which is contacted by the second member to generate the positional signals. An arrangement of this type is disclosed, for example, in U.S. Pat. No. 4,653,086. Other types of coupling used between the first and second members might be acoustic, optical, resistive, capacitive, electromagnetic, ultrasonic and piezoelectric.

In the systems in use today, since the above graphical units are separate attachments to the computer system along with the aforementioned keyboards, they increase the overall space requirements for the computer equipment which is undesirable from the users standpoint.

It is therefore, a primary object of the present invention to provide an apparatus having the capability of entering keyed information as well as graphical information.

SUMMARY OF THE INVENTION

In accordance with the principles of the present invention, the above and other objectives are realized in an apparatus including actuatable keys by further including therein means comprising an extended, two dimensional first member capable of generating a signal for designating a position on the member. The first member is situated or is capable of being placed such that it and one or more of the keys are in overlapping relationship. The means also includes a circuit member for converting position designating signals into signals which can be understood by a computer for storage and display. A second member cooperates with the first member for designating the position on the first member.

In the embodiment of the invention to be disclosed hereinafter, the first member is in the form of a grid of planar wires and the second member is provided with a coil. The grid of wires is situated beneath the keys and is spaced from the keys such that the second member, when placed in proximate relationship to the keys, can electromagnetically couple with the grid.

In this embodiment, a writing surface positionable above the keys is also provided for supporting the second member as it designates positions on the grid.

BRIEF DESCRIPTION OF THE DRAWINGS

The above and other features and aspects of the present invention will become more apparent upon reading the following detailed description in conjunction with the accompanying drawings, in which:

FIG. 2 illustrates a cross section taken through the keyboard of FIG. 1.

DETAILED DESCRIPTION

Figure 1:
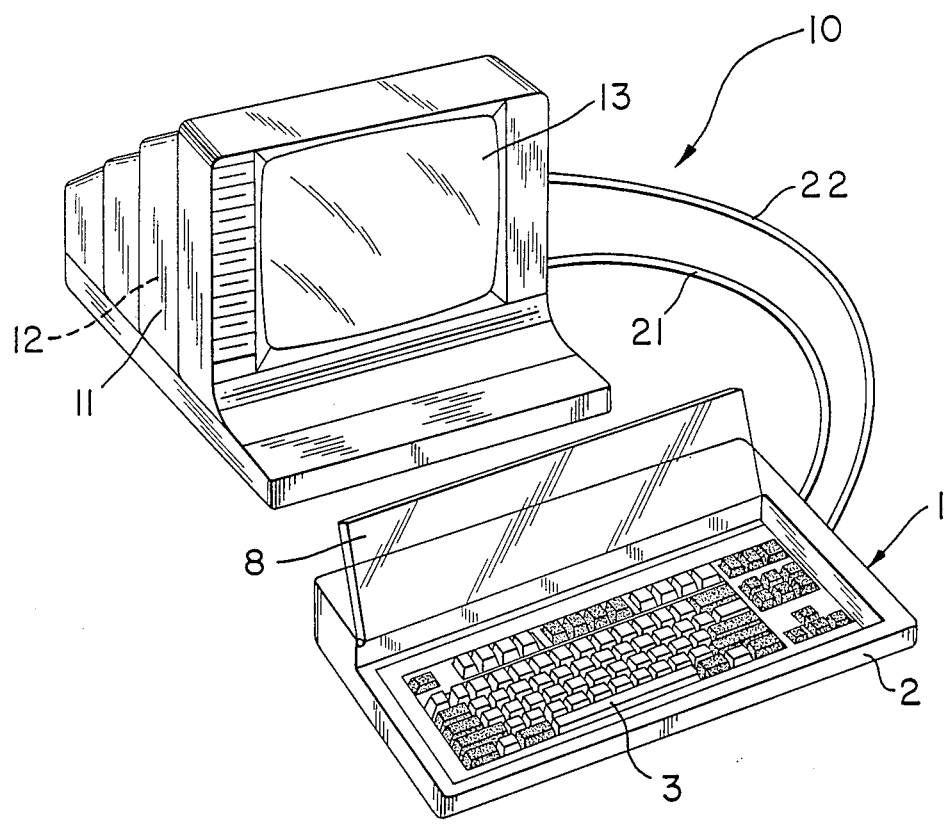
FIG. 1 shows a computer system which employs a keyboard in accordance with the principles of the present invention.

FIG. 1 shows a computer system 10 employing a keyboard 1 in accordance with the principles of the present invention. The computer system 10 includes computer 11 provided with a central processing unit (CPU) 12 (not visible) and a display 13, shown as a CRT display.

The keyboard 1 comprises a housing 2 which supports a set of actuatable keys 3 for keying in alphanumeric characters to the computer 11. Cooperating with the keys 3 and situated below them in the housing 2 is an integrated circuit card 4 and associated processing circuitry 5 which translates the key actuations into signals recognizable by the CPU 12 of the computer 10. These signals are conveyed to the computer 10 via a cable 21 which connects the key output of the keyboard 1 to one of the CPU inputs on the computer.

In normal fashion, inputting a particular character to the computer is effected by the user actuating the keyboard key corresponding to the character. This results in a corresponding signal from the card 4 and circuitry 5 which is conveyed by the cable 21 to the computer 10. The CPU 12 of the computer 10 recognizes this signal as indicative of the character being entered and stores the signal as well as displays the entered character on display 13 to verify to the user that the appropriate character has been entered.

In accordance with the principles of the present invention, in addition to the keyboard 1 providing the user with the capability of entering alphanumeric and other characters into the computer 10, the keyboard 1 is further adapted to allow entry of handwritten or graphical information. This is accomplished, in accordance with the invention, as can be seen in FIG. 2, by further including in the keyboard 1 a planar cross grid of wires 9 which are capable of generating a signal designating a position on grid.

As shown, the grid of wires 9 is mounted in the keyboard 1 below the circuit card 4. More particularly, the position of the grid 9 in the housing 2 is such that an electromagnetic field indicative of the designated position on the grid can be coupled between the grid and a position above the surface of the keys 3.

In the case shown, a stylus 6 carrying a coil 6a is provided for generating the position designating electromagnetic field. Specifically, a field is generated by the stylus coil 6a at the tip end 6b of the stylus which overlies the particular position of the grid being designated. This field causes the cross grid of wires to develop signals indicative of the designated position.

A conversion circuit 7, also disposed in the keyboard housing 2, is connected by wires (not shown) to the grid wires. The conversion circuit 7 responds to the signals from the grid and converts them to signals understandable by the computer 10. A cable 22 couples these signals from the conversion circuit 7 output to a further CPU input of the computer 10.

As with the output signals from the card 4 and circuit 5 of the keys 3, the CPU 12 of the computer 10 recognizes the signals outputted from the conversion circuit 7 as indicative of the designated positions on the grid 9. The CPU 12 then causes these signals to be stored as well as the position indicated by the signals to be displayed on the display 13. The user is thus provided with visual verification of the path being traced by the stylus 6 in relation to the grid 9 as this graphical information is being stored in the computer 10.

As can be appreciated, with the present invention, a single keyboard unit provides the dual capability of inputting both alphanumeric and graphical information into the computer 10. Furthermore, by accomplishing this through proximate, overlapping relationship of the keys 3 of the keyboard and the grid 9, a significant space saving is achieved as compared to use of two separate units. An overall more attractive and compact unit results.

In a further aspect of the invention, the keyboard 1 is further provided with a writing surface 8 which is mounted to the housing 2 so as to be positionable in and out of overlapping relationship with the keys 3 above the top surface thereof. This positioning can be effected either by pivotting, sliding, snapping in place or otherwise moving the surface 8.

The surface 8, when positioned over the keys 3, can be used as a rest or writing surface for the stylus 6 as the user traces the desired pattern. This facilitates making the trace.

The keyboard 1 can be easily adapted to incorporate the grid 9 and the conversion circuit 7 by utilizing the grid and conversion circuits employed in the aforementioned Numonics digitizer Model No. 2201. Furthermore, the stylus 6 can be the stylus employed in such digitizer.

While in the embodiment of FIGS. 1 and 2, the grid 9 is illustrated as mounted below the keys 3 and card 4, the grid 9 could otherwise be mounted above the keys 3 and moved into overlapping relationship therewith, similar to the writing surface 8, as by pivotting, sliding, snapping in place or otherwise. In such case, the conversion circuit 7 could continue to be mounted within the housing 2 and provision would be made to connect the wiring from the grid to the circuit 7 through the housing. Alternatively, the circuit 7 could be mounted to the housing elsewhere.

It should also be noted that it is within the contemplation of the invention to use members in place of the grid 9 and stylus 6 which accomplish position designation other than through coupling of an electromagnetic field. Thus, the resistive type member disclosed in the above-mentioned '086 patent and its associated stylus could be used, as well as other types of tablet and stylus combinations suitably adapted to the keyboard 1 in accordance with the teachings of the invention.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention. Thus, for example, while the circuit card 4 and the grid 9 have been shown as separate elements they could be integrated into a single element providing both functions.

What is claimed is:

1. Apparatus for use in generating signals for inputting into a computer comprising:
   a keyboard including:
   first means comprising one or more actuatable keys for generating signals corresponding to each key which is actuated;
   an extended two dimensional member positioned or positionable such that said extended two dimensional member and at least one or more of said keys are in overlapping relationship, said member capable of generating a signal designating a position on said member;
   and said first means generating said signals corresponding to said keys independently of said extended two dimensional member.

2. Apparatus in accordance with claim 1 wherein:
   said member comprises a grid of wires.

3. Apparatus in accordance with claim 1 wherein:
   said member is positioned or positionable below said keys.

4. Apparatus in accordance with claim 1 further comprising:
   a writing surface disposed above said keys and positionable in overlapping relationship to said at least one or more keys.

5. Apparatus in accordance with claim 1 wherein:
   said member is disposed above said keys and is positionable in overlapping relationship to said at least one or more keys.

6. Apparatus in accordance with claim 1 wherein:
   said member is capable of coupling electromagnetic energy to and from said member.

7. Apparatus in accordance with claim 6 wherein said member comprises a grid of wires.

8. Apparatus in accordance with claim 6 wherein:

said member is positioned below said at least one or more keys and such that it is capable of coupling electromagnetic energy to and from said member from positions proximate and above said keys.

9. Apparatus in accordance with claim 8 further comprising:
a further member having a coil therein for generating an electromagnetic field, said further member being positionable above and in proximate relationship to said at least one or more keys for coupling an electromagnetic field to said member for designating said position on said member.

10. Apparatus in accordance with claim 1 wherein: said keyboard further comprises means for converting said signal to an input signal for entry into said computer.

11. Apparatus in accordance with claim 10 wherein: said computer has a storage and a display for storing said input signal and displaying the designated position indicated by said input signal.

12. Apparatus in accordance with claim 1 further comprising:
a further member for placement in proximate relationship to said member at said designated position for causing said member to generate said signal.

* * * * *